No. 851,262. PATENTED APR. 23, 1907.
C. A. TATUM.
GLASS BLOWING MACHINE.
APPLICATION FILED APR. 12, 1905.
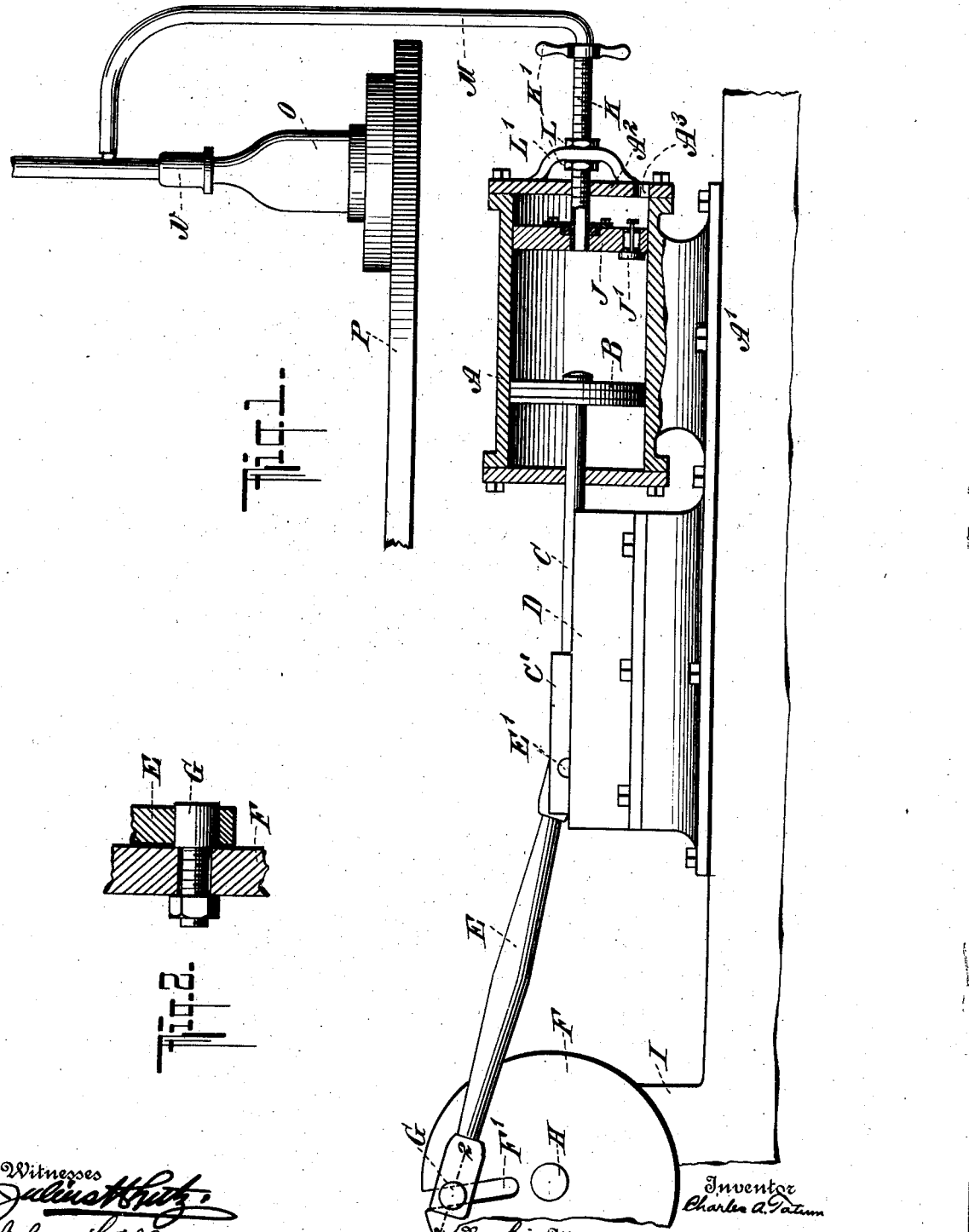

UNITED STATES PATENT OFFICE.

CHARLES A. TATUM, OF NEW YORK, N. Y.

GLASS-BLOWING MACHINE.

No. 851,262.  Specification of Letters Patent.  Patented April 23, 1907.

Application filed April 12, 1905. Serial No. 255,105.

*To all whom it may concern:*

Be it known that I, CHARLES A. TATUM, a citizen of the United States, and a resident of the borough of Manhattan, city, county, and State of New York, have invented certain new and useful Improvements in Glass-Blowing Machines, of which the following is a specification.

My invention relates to machines for blowing glass and has for its object to provide an adjustable means whereby a measured amount of air may be delivered to the blow head.

Other objects of my invention will appear in the detail description following hereinafter and the features of novelty will be pointed out in the appended claims.

Reference is to be had to the accompanying drawings in which

Figure 1 is an elevation with parts in section of as much of a machine as is necessary to illustrate my invention and Fig. 2 is a sectional view on the line 2—2 of Fig. 1.

A represents an air or blowing cylinder mounted upon a base A' in which cylinder moves the piston B connected with a piston rod C the cross head C' of which slides in suitable bearings D also mounted on the base A'.

E is a connecting rod which has its one end connected to the cross-head at E'; at its other end the connecting rod E is movably secured to the crank disc F by means of a crank pin G which is adjustable in a slot F' of the crank disc. The purposes of this construction will be described more fully hereinafter. The crank disc F is mounted on a shaft H supported in a suitable bearing I. The crank disc F may be rocked or rotated in any suitable manner as for instance coupling the said disc with an operating mechanism in any well known manner.

J represents an adjustable head provided with an air inlet valve J'; with the said head J is rotatably connected a hollow screw K which passes through the stationary head $A^2$ of the cylinder which is provided with an opening $A^3$. The hollow screw is provided with a handle K' and is held in any desired position by lock nuts L engaging a brace L' on the head $A^2$. The hollow screw K is connected by means of a flexible pipe M with the blow head N which communicates with the mould O. The said mould O is mounted on a table P which forms part of the machine proper.

The operation of the apparatus is as follows: When it has been ascertained by calculation how large or how small a charge of air is to be delivered to the blow head, this charge varying according to the capacity of the mould, the stroke of the piston is adjusted by moving the crank pin G in the slot F' of the disc F to obtain the result desired. The piston is then moved to the extreme of its stroke (toward the right in Fig. 1) and the adjustable head J is then brought up close to the piston B by turning the hollow screw K so that there will be just sufficient clearance between the piston when it reaches the end of its stroke and the said adjustable head. If the piston is now operated the same amount of air at the same pressure will be delivered to the blow head at each forward operation of said piston.

It will be understood that the air is completely forced out of the cylinder A at each forward operation of the piston, thus resulting in a gradual increase of pressure which attains its required maximum at the end of the stroke. This result could not be obtained with accuracy if the adjustment of the length of the piston stroke alone were depended on as for instance if the stroke of the piston were short a cushion of air would remain in the cylinder between the piston at the end of its stroke and the head, which would result in an insufficient pressure being delivered to the blow head, the consequence being that the articles produced would be of an inferior grade. It is to be further understood that as the piston travels back air will be sucked into the cylinder A through the opening $A^3$ and the air inlet valve J' which is so arranged that it will be closed as soon as the piston again travels forward, so that none of the air can escape except through the pipe M.

Various modifications may be made without departing from the nature of my invention.

I claim and desire to secure by Letters Patent:

1. In a blowing device, the combination of a cylinder, a piston movable therein, means for adjusting the stroke of the piston so as to vary the amount of air displaced, and a head forming a working chamber with the piston and cylinder, said head being adjustable toward and from the piston so as to avoid the formation of a dead space as the stroke of the piston is varied.

2. In a blowing device the combination of a cylinder, a piston movable therein, means for adjusting the stroke of the piston, and a head adjustable toward and from the piston and forming a compression chamber therewith, said head having a delivery conduit connected therewith.

3. In a blowing device the combination of a cylinder, a piston movable therein, means for adjusting the stroke of the piston, and a head adjustable toward and from the piston and forming a compression chamber therewith, said head having suction and delivery channels.

4. In a blowing device the combination of a cylinder, a piston movable therein, a head adjustable toward and from the piston and forming a compression chamber therewith, and a delivery conduit a portion of which is carried by said head and movable therewith.

5. In a blowing device the combination of a cylinder, a piston movable therein, a head adjustable toward and from the piston and forming a compression chamber therewith, and provided with suction and delivery channels.

6. The combination of a cylinder, a piston movable therein, means for adjusting the stroke of the piston, a head adjustable toward and from said piston, a blow head, and a delivery conduit extending from the adjustable head of the cylinder to the blow head, a portion of said delivery conduit being attached to and movable with the adjustable cylinder head.

7. In a blowing device, the combination of a cylinder, a piston movable therein, means for adjusting the relative distance between the piston and the cylinder head while the piston is out of operation, and means for adjusting the stroke of the piston so that said piston will come close to the cylinder head whatever adjustment may have been made of the relative distance between piston and cylinder head 8. In a blowing device, the combination of a cylinder, a piston movable therein, a head adjustable toward and from the piston and forming a working chamber therewith, and a conduit a portion of which is carried by said head and movable therewith.

9. In a blowing device, the combination of a cylinder, a piston movable therein, means for adjusting the stroke of the piston, and a head adjustable toward and from the piston and forming a working chamber therewith, said head having a conduit connected therewith.

10. In a blowing device, the combination of a cylinder, a piston movable therein, means for adjusting the stroke of the piston, and a head adjustable toward and from the piston and forming a working chamber therewith, said head having inlet and outlet channels.

11. In a blowing device, the combination of a cylinder, a piston movable therein, a head adjustable toward and from the piston and forming a working chamber therewith, and provided with inlet and outlet channels.

12. In a blowing device, the combination of a cylinder, a piston movable therein, means for adjusting the stroke of the piston, a head adjustable toward and from the piston, a blow head, and a conduit extending from the adjustable head of the cylinder to the blow head, a portion of said conduit being attached to, and movable with, the adjustable cylinder head.

In testimony whereof, I have hereunto set my hand in the presence of two subscribing witnesses.

CHARLES A. TATUM.

Witnesses:
JOHN LOTKA,
JOHN A. KEHLENBECK.